United States Patent
Morita

(10) Patent No.: US 7,263,279 B2
(45) Date of Patent: Aug. 28, 2007

(54) RECORDING/PLAYBACK DEVICE, AND RECORDING MEDIUM ACCESS METHOD

(75) Inventor: Kazushige Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 10/822,073

(22) Filed: Apr. 8, 2004

(65) Prior Publication Data

US 2004/0255074 A1 Dec. 16, 2004

(30) Foreign Application Priority Data

Apr. 10, 2003 (JP) ............................ 2003-107052

(51) Int. Cl.
*H04N 5/91* (2006.01)
(52) U.S. Cl. .............................. 386/97; 386/125; 707/3
(58) Field of Classification Search ................... 386/97, 386/98, 124–126, 52, 46, 83; 707/1–5, 104.1
See application file for complete search history.

(56) References Cited

U.S. PATENT DOCUMENTS 6,556,770 B2* 4/2003 Ando et al. .................... 386/52
2002/0168179 A1* 11/2002 Kikuchi et al. ................ 386/97
2003/0002194 A1* 1/2003 Andoh ......................... 360/69
2003/0026589 A1* 2/2003 Barton et al. .................. 386/46
2003/0095600 A1* 5/2003 Tsukagoshi ............ 375/240.13

* cited by examiner

Primary Examiner—Wilson Lee
(74) Attorney, Agent, or Firm—Oblon, Spivak, McClelland, Maier & Neustadt, P.C.

(57) ABSTRACT

A DVD recorder is provided in which access control is effected by a driver layer (41), a UDF file system layer (42,) that reads and writes data from and to a DVD-RW with reference to a file system, and a data base layer (43) that accesses the UDF file system layer (42) with reference to content management information for management of contents stored in the DVD-RW. The data base layer (43) reads TMP_VMGI which is intermediate-state management information for the DVD-RW, and provisionally registers a file system into the UDF file system layer (42) with reference to information included in the TMP_VMGI. Thus, a file system is provisionally formed even if the DVD-RW loaded in the DVD recorder is in the intermediate state having no file system recorded therein.

8 Claims, 8 Drawing Sheets

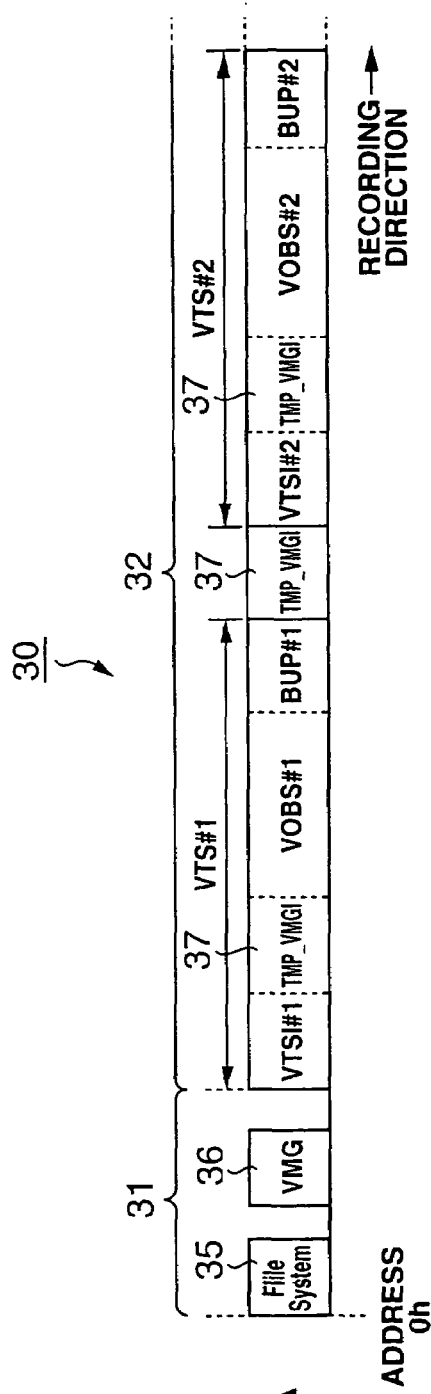
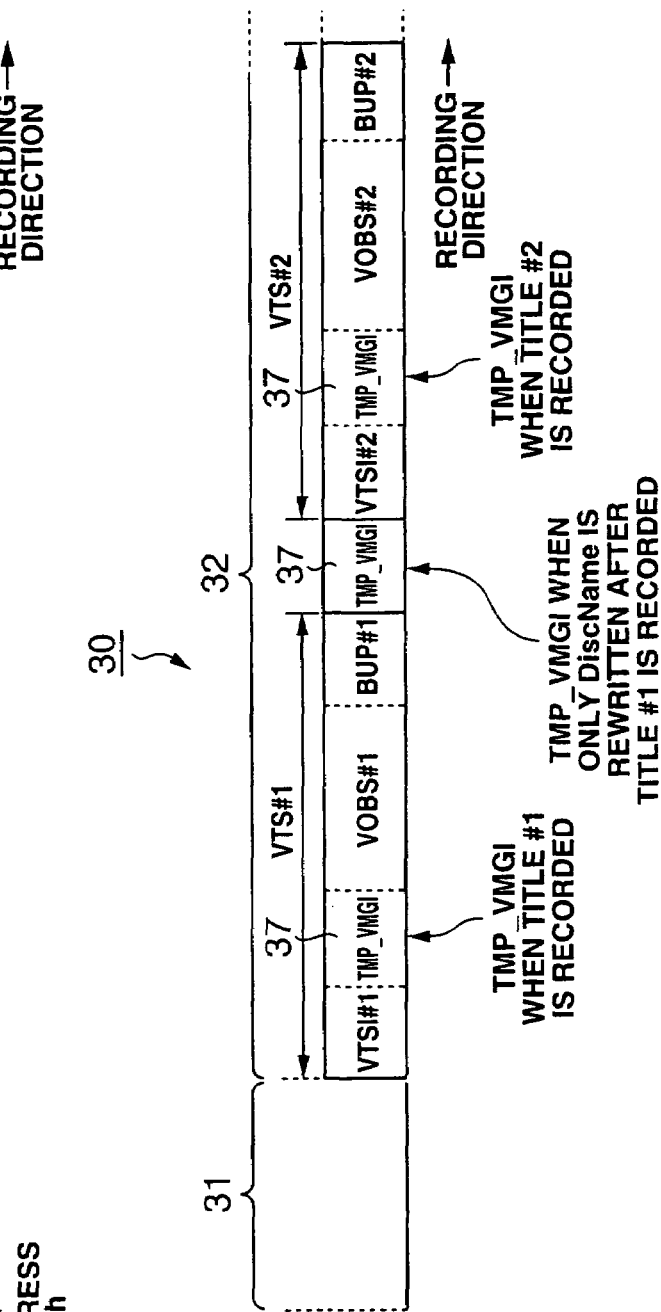
FIG.4A
FIG.4B

RECORDING/PLAYBACK DEVICE, AND RECORDING MEDIUM ACCESS METHOD

BACKGROUND OF THE INVENTION

1. Field of the Invention

The present invention relates to a recording/playback device that records and reproduces data to and from a recording medium such as DVD or the like, and a recording medium access method adopted in the recording/playback device.

This application claims the priority of the Japanese Patent Application No. 2003-107052 filed on Apr. 10, 2003, the entirety of which is incorporated by reference herein.

2. Description of the Related Art

As a device for recording TV broadcast programs or photographed images, DVD recorders each using a recording DVD as a recording medium have become popular taking the place of the conventional video tape recorders. The recording DVD is an optical disk of 12 cm in diameter and 1.2 mm in thickness and has a recording capacity of 4.7 giga-bytes per side.

There have been proposed recording DVDs of five formats including DVD-R, DVD-RW, DVD+RW, DVD+R and DVD-RAM. "R" stands for "recordable ("write once, read many)" and "RW" stands for "rewritable (rewritable more than once)". These formats were proposed by the consumer specification association "DVD Forum" (Internet address: URL :http://www.dvdforum.gr.jp/) and another consumer specification association "DVD+RW Alliance" (Internet address: URL :http://www.dvdrw.com/).

The DVD-R and DVD+R are optical disks recordable only once (write once, read many). The DVD-R is an optical disk complying with the format proposed by the DVD Forum, and DVD+RW is an optical disk complying with the format proposed by the DVD+RW Alliance.

The DVD-RW and DVD+RW are optical disks compatible in format with the read-only DVD disk (DVD-VIDEO) defined by the DVD Forum. They are rewritable a plurality of times. These optical disks can be played back by the conventional read-only DVD player. The DVD-RW is an optical disk complying with the format proposed by the DVD Forum, and DVD+RW is an optical disk complying with the format proposed by the DVD+RW Alliance.

The DVD-RAM is a rewritable optical disk encased in a cartridge. It has a low compatibility in format with the DVD-VIDEO DISK, namely, it is considerably different from the other types of DVD. The DVD-RAM is an optical disk proposed by the DVD Forum.

Also, in the DVD-VIDEO Standard proposed by the DVD Forum, a unit called "title" is defined as a data unit. The "title" defined in this Standard is a concept indicating a unit in which one content such as one movie, one musical composition in a music album or the like is reproduced, for example. It is stated in the DVD-VIDEO Standard that up to 99 titles can be recorded to one DVD disk.

The optical disks including DVD-R, DVD-RW, DVD+RW, DVD+R and DVD-RAM adopt the Universal Disk Format (UDF™ ISO/IEC 13346) as a logical format.

Note here that the DVD-RW, DVD-R, etc. adopt formats made compatible with the format defined in the DVD-VIDEO Standard by recording necessary management data and dummy data other than content data (finalizing) after completion of recording the content data.

The UDF file system will not be recorded to any DVD-RW or DVD-R disk before the latter is finalized. That is, any DVD-RW or DVD-R disk, not yet finalized, have no UDF file system recorded therein.

Thus, with any ordinary operation, it is not possible to make a file system-based access control of any DVD-RW or DVD-R disk, not yet finalized.

Also, according to the DVD-VIDEO Standard, referring to a VMGI file as an information file in the title menu allows access from a data base to another file without reference to the file system. Thus, actually, the file system has to have stated therein the top position of each file therein. However, many DVD-VIDEO disks having the top position written in a wrong position as shown in FIG. 1 have been in the market. Referring to the file system in such a disk results in unsuccessful opening each of the files recorded in the disk.

OBJECT AND SUMMARY OF THE INVENTION

It is therefore an object of the present invention to overcome the above-mentioned drawbacks of the related art by providing a recording/playback device capable of via-file system recording and reproducing data to and from a recording medium being in an intermediate state, namely, having no file system recorded therein or a recording medium having a file system recorded therein but it is partially erroneous, and a recording medium access adopted in the recording/playback device.

The above object can be attained by providing a recording/playback device including according to the present invention:

a system controlling means for controlling access to the recording medium by a file system processing module that reads and writes data from and to the recording medium with reference to a file system which is information including a physical storage location of a file, and a data base processing module that accesses the file system processing module with reference to content management information for management of contents stored in the recording medium.

The above file system processing module reads and writes data from and to the recording medium with reference to the file system, and the data base processing module issues, to the file system processing module, commands for reading and writing a file according to the content management information.

The recording medium has recorded therein file search information indicating physical recorded position of a file having the content management information stored therein, and the data base processing module registers, into the file system, attribute information on a file including at least the content management information with reference to the file search information.

Also the above object can be attained by providing a recording medium access method of controlling access to the recording medium by a file system processing module that reads and writes data from and to the recording medium with reference to a file system which is information including a physical storage location of a file, and a data base processing module that accesses the file system processing module with reference to content management information for management of the contents stored in the recording medium.

In the above recording medium access method, the data base processing module issues, to the file system processing module, commands for reading and writing a file according to the content management information, and the file system processing module reads and writes data from and to the recording medium with reference to the file system.

Also in the above recording medium access method, when mounting a file system, the data base processing module reads, from the recording medium, file search information indicating physical recorded position of a file having the content management information stored therein, and registers attribute information on a file including at least the content management information into the file system with reference to the read file search information.

In the recording/playback device and recording medium access method according to the present invention, the file system recorded in the recording medium is not read for registration, but the file management information is read from a predetermined file in the recording medium and a file system generated based on the file management information is newly registered.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 4 explains a format (INC mode) of the DVD-RW disk;

DETAILED DESCRIPTION OF THE PREFERRED EMBODIMENTS

The present invention will be described concerning a DVD recorder as an embodiment of the present invention with reference to the accompanying drawings.

Figure 1:
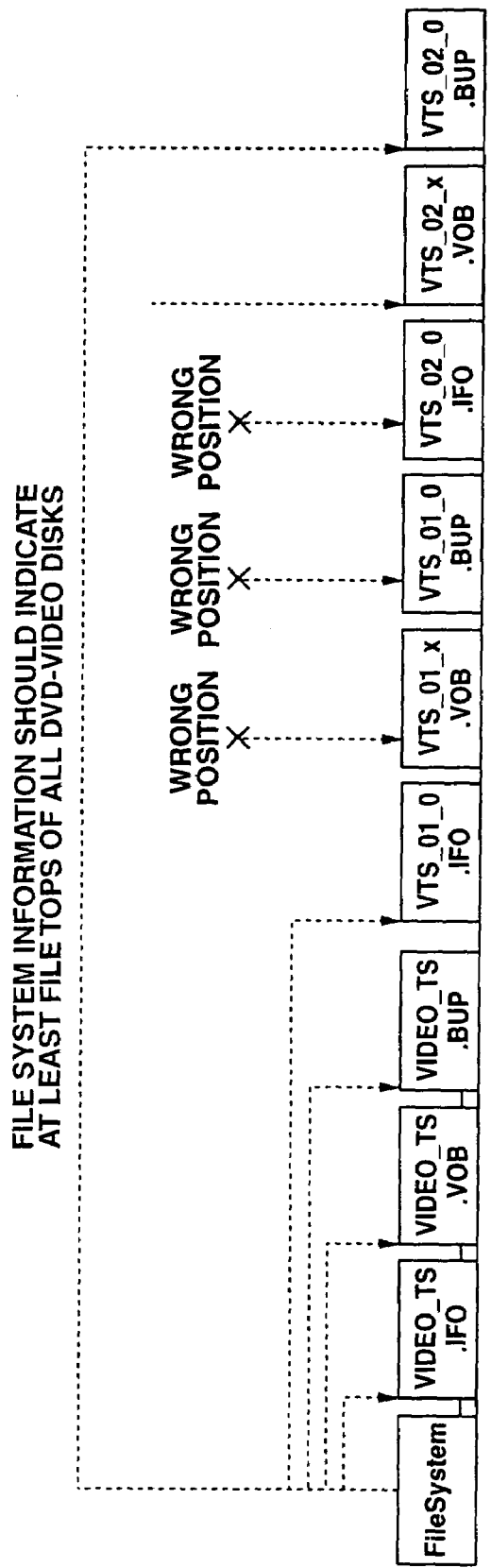
FIG. 1 explains a DVD disk in which the statement of a file system is partially incorrect.
Figure 2:
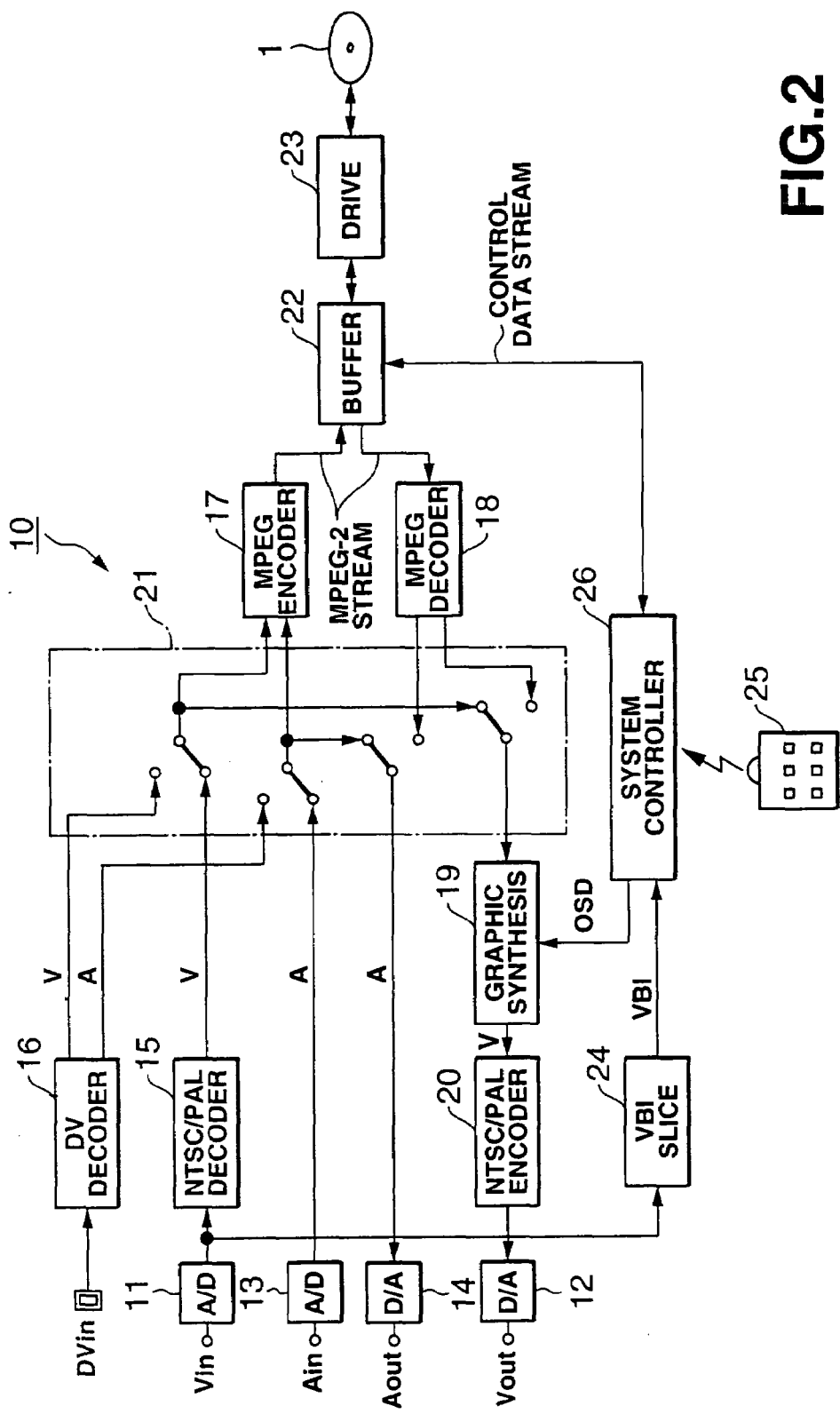
FIG. 2 is a block diagram of a DVD recorder as an embodiment of the present invention.

Referring now to FIG. 2, there is illustrated in the form of a block diagram the DVD recorder according to the present invention. The DVD recorder is generally indicated with a reference 10.

The DVD recorder 10 records a TV broadcast program data or AV (video/audio) signal read from a recording tape to a DVD disk, and reads AV signal from the DVD disk and outputs it to a display or speaker.

The DVD recorder 10 is a multi-purpose disk recorder compatible with DVD-VIDEO, DVD-R and DVD-RW proposed by the aforementioned consumer specification association "DVD Forum" and DVD+R and DVD+RW proposed by the aforementioned consumer specification association "DVD+RW Alliance". These types of DVD disks compatible with the DVD recorder 10 will be generically referred to as "DVD disk 1" wherever appropriate.

The internal construction of the DVD recorder 10 is as will be explained with reference to FIG. 2.

As shown, the DVD recorder 10 includes a video input terminal Vin, audio input terminal Ain, video output terminal Vout, audio output terminal Aout, digital interface terminal DVin, video A-D converter 11, video D-A converter 12, audio A-D converter 13, and an audio D-A converter 14.

The above video input terminal Vin is connected by a video cable to a tuner, set top box, video player or the like. The DVD recorder 10 is supplied at the video input terminal Vin thereof with a video signal in a predetermined video format such as NTSC, PAL or the like from one of such devices. It should be noted that the video signal supplied to the video input terminal Vin is converted from analog to digital by the video A-D converter 11 before being supplied to inside the DVD recorder 10. The above video output terminal Vout is connected by a video cable to a TV monitor, video recorder or the like. The DVD recorder 10 delivers, at the video output terminal Vout thereof, a video signal in a predetermined video format such as NTSC, PAL or the like to such devices. It should be noted that the video signal delivered at the video output terminal Vout is converted from digital to analog by the video D-A converter 12 before being delivered to outside the DVD recorder 10.

The above audio input terminal Ain is connected by an audio cable to a tuner, set top box, audio player or the like. The DVD recorder 10 is supplied at the audio input terminal Ain thereof with an audio signal which is a sound and music signal in a predetermined format from one of such devices. It should be noted that the audio signal supplied to the audio input terminal Ain is converted from analog to digital by the audio A-D converter 13 before being supplied to inside the DVD recorder 10. The above audio output terminal Aout is connected by an audio cable to an audio device, audio recorder or the like. The DVD recorder 10 delivers, at the audio output terminal Aout thereof, an audio signal in a predetermined format, for example, to such devices. It should be noted that the audio signal delivered at the audio output terminal Aout is converted from digital to analog by the audio D-A converter 14 before being delivered to outside the DVD recorder 10.

The above digital interface terminal DVin is connected by a digital data transmitting interface cable such as an IEEE 1394 terminal, USB or the like to a DVD player that reproduces AV data (video and audio data) from a DV tape cassette. The DVD recorder 10 is supplied at the digital interface terminal DVin thereof with AV data (will be referred to as "DV data" hereunder wherever appropriate) in a DV format, which the DV player has read from the DV tape cassette.

As shown in FIG. 2, the DVD recorder 10 includes also an NTSC/PAL decoder 15, DV decoder 16, MPEG encoder 17, MPEG decoder 18, graphic synthesis circuit 19 and an NTSC/PAL encoder 20.

The above NTSC/PAL decoder 15 converts a video signal in the NTSC or PAL format, supplied at the video input terminal Vin and digitized by the video A-D converter 11, into a video signal in the ITU-R BT. 601 format.

The above DV decoder 16 converts DV data supplied at the digital interface terminal DVin into video signal in the ITU-R BT. 601 format and audio signal in a predetermined format.

The above MPEG encoder 17 is supplied with the video signal in the ITU-R BT. 601 format and audio signal in the predetermined format, digitized by the audio A-D converter 13, and encodes these video and audio signals by compression with the MPEG-2 technique to provide MPEG-2-based AV data stream (will be referred to as "MPEG-2 stream" hereunder wherever appropriate).

The above MPEG decoder 18 is supplied with the MPEG-2 stream and decodes it by decompression (expansion) to provide a video signal in the ITU-R BT. 601 format and audio signal in a predetermined format.

The above graphic synthesis circuit 19 synthesizes an external on-screen display image (will be referred to as "OSD image" hereunder wherever appropriate) on a display screen for the video signal in the ITU-R BT. 601 format.

The above NTSC/PAL encoder 20 converts the video signal in the ITU-R BT. 601, supplied from the graphic synthesis circuit 19, into a video signal in the NTSC or PAL format, and delivers it at the video output terminal Vout.

The DVD recorder 10 includes also a switching circuit 21 that selects a transmission path for video and audio signals.

The above switching circuit 21 selects a transmission path for each of recording and playback. When it has selected a transmission path for recording, it will further select a transmission path for input of each of DV data and other signal.

More specifically, the switching circuit 21 selects a transmission path as follows. For recording any other signal than DV data, the switching circuit 21 selects a transmission path along which a video signal supplied from the NTSC/PAL decoder 15 will be passed to the MPEG encoder 17 and graphic synthesis circuit 19 while an audio signal supplied from the audio A-D converter 13 will be passed to the MPEG encoder 17 and audio A-D converter 14. For recording DV data, the switching circuit 21 selects a transmission path along which a video signal supplied from the DV decoder 16 will be passed to the MPEG encoder 17 and graphic synthesis circuit 19 while an audio signal supplied from the DV decoder 16 will be passed to the MPEG encoder 17 and audio D-A converter 14. For playback, the switching circuit 21 selects a transmission path along which a video signal supplied from the MPEG decoder 18 will be passed to the graphic synthesis circuit 19 while an audio signal supplied from the MPGE decoder 18 will be passed to the audio D-A converter 14.

The DVD recorder 10 includes also a buffer circuit 22 and a drive unit 23.

The above buffer circuit 22 is a memory to temporarily store MPGE-2 stream and control data stream, that are written to or read from the DVD disk 1. The above drive unit 23 has the DVD disk 1 loaded therein, and makes a physical access to the loaded DVD disk 1 to write or read data to or from the latter. It should be noted that the "control data stream" is a data stream containing information defined in the format of the DVD disk 1.

The DVD recorder 10 includes also a VBI slice circuit 24.

The above VBI slice circuit 24 is to detect information (VBI) included in the blanking time of a video signal from a video signal supplied from the video input terminal Vin.

The DVD recorder 10 includes also an input device 25 and a system controller 26.

The above input device 25 is an infrared remote controller or the like to be operated by the user to input information intended for operating the DVD recorder 10. Information supplied from the input device 25 is supplied to the system controller 26.

The above system controller 26 is a control block composed of a microcomputer to set and control each of the aforementioned component circuits and the like.

The system controller 26 operates as will be described more specifically:

For example, the system controller 26 reads the control data stream from the buffer circuit 22 and controls, access to the DVD disk 1, display on a TV monitor and the like on the basis of the control data. At start or end of data recording, the system controller 26 generates control information for data going to be recorded or having been recorded, and writes the control information as a data stream in a format to the DVD disk 1. The system controller 26 generates and analyzes header information of the MPEG-2 stream.

Also, the system controller 26 generates an OSD image such as a menu screen or the like, supplies the OSD image thus generated to the graphic synthesis circuit 19, and displays the OSD image on a TV monitor. Further, the system controller 26 updates the OSD image appropriately according to input information from the input device 25, and displays the updated OSD image on the TV monitor. Moreover, the system controller 26 makes a variety of control operations corresponding to input information from the input device 25, and a predetermined control that depends upon a currently displayed OSD image and currently supplied input information.

Further, the system controller 26 is supplied with VBI detected in an input video signal supplied from the VBI slice circuit 24, and supplies necessary one of multiple pieces of information included in the VBI to the MPEG encoder 17 which will thus be caused to encode the input VBI into header information for the MPEG-2 stream. When the DVD recorder 10 is in the playback mode, the system controller 26 generates VBI on the basis of the necessary one of the information pieces detected in the header information of the MPEG-2 stream, and supplies the VBI to the NTSC/PAL encoder 20 which will thus be caused to encode the VBI into a predetermined blanking position for a video signal to be outputted.

The DVD recorder 10 constructed as above operates when in the recording mode as will be described below:

When in the recording mode, the DVD recorder 10 is supplied with external video and audio signals. The input video signal is converted by the NTSC/PAL decoder 15 or DV decoder 16 into a video signal in the ITU-R BT. 601 format. The video signal in the ITU-R BT. 601 format is supplied to the MPEG encoder 17 via the switching circuit 21, and encoded along with the audio signal into an MPEG-2 stream. The buffer circuit 22 provisionally stores the MPEG-2 stream encoded by the MPEG encoder 17 while provisionally storing a control data stream generated by the system controller 26. Then in the DVD recorder 10, the drive unit 23 will read the MPEG-2 stream and control data stream from the buffer circuit 22, and write the read data to the DVD disk 1, in a sequence based on the format of the DVD disk 1.

Also, the DVD recorder 10 operates as follows to allow the user to make real-time EE monitoring of an image and sound being recorded.

The video signal converted by the NTSC/PAL decoder 15 or DV decoder 16 into the ITU-R BT. 601 format is also supplied to the graphic synthesis circuit 19 via the switching circuit 21. The video signal supplied to the graphic synthesis circuit 19 is combined with an OSD image, if any supplied from the system controller 26, or supplied as it is to the NTSC/PAL encoder 20 if no OSD image is supplied from the system controller 26. The video signal in the ITU-R BT. 601 format, supplied to the NTSC/PAL encoder 20 is converted into a video signal in the NTSC or PAL format, and then into an analog signal before being delivered to outside the DVD recorder 10. Also, the input audio signal is converted into an analog signal before being delivered to outside the DVD recorder 10 via the switching circuit 21.

When in the playback mode, the DVD recorder 10 operates as follows:

When the DVD recorder 10 is in the playback mode, the drive unit 23 reads the MPEG-2 stream and control data stream from the DVD disk 1, and stores them into the buffer circuit 22. From the buffer circuit 22, the MPEG-2 stream is read by the MPEG decoder 18, while the control data stream is read by the system controller 26. The MPEG-2 stream thus read is decoded by the MPEG decoder 18 into video and audio signals in the ITU-R BT. 601 format. The audio signal thus decoded is converted into an analog signal before being delivered to outside the DVD recorder 10 via the switching circuit 21. The video signal in the ITU-R BT. 601 format is supplied to the graphic synthesis circuit 19 via the switching circuit 21. The video signal supplied to the graphic synthesis circuit 19 is combined with an OSD image, if any supplied from the system controller 26, or supplied as it is to the NTSC/PAL encoder 20 if no OSD image is supplied from the system controller 26. The video signal in the ITU-R BT. 601 format, supplied to the NTSC/PAL encoder 20, is converted into a video signal in the NTSC or PAL format, and converted into an analog signal before being delivered to outside the DVD recorder 10. Also, the system controller 26 controls, according to the control data stream read from the DVD disk 1, reading position on the DVD disk and a variety of display operations.

Format of DVD-RW:

Data is recorded to the DVD-RW disk in a format compatible with DVD-VIDEO DISK as will be described below:

The format compatible with DVD-VIDEO DISK, adopted in the DVD-RW disk, include two modes: ROW (restricted overwrite) and INC (incremental recording). The INC mode is applied also to the DVD-R disk as a recordable DVD (recordable only once).

Figure 3A:
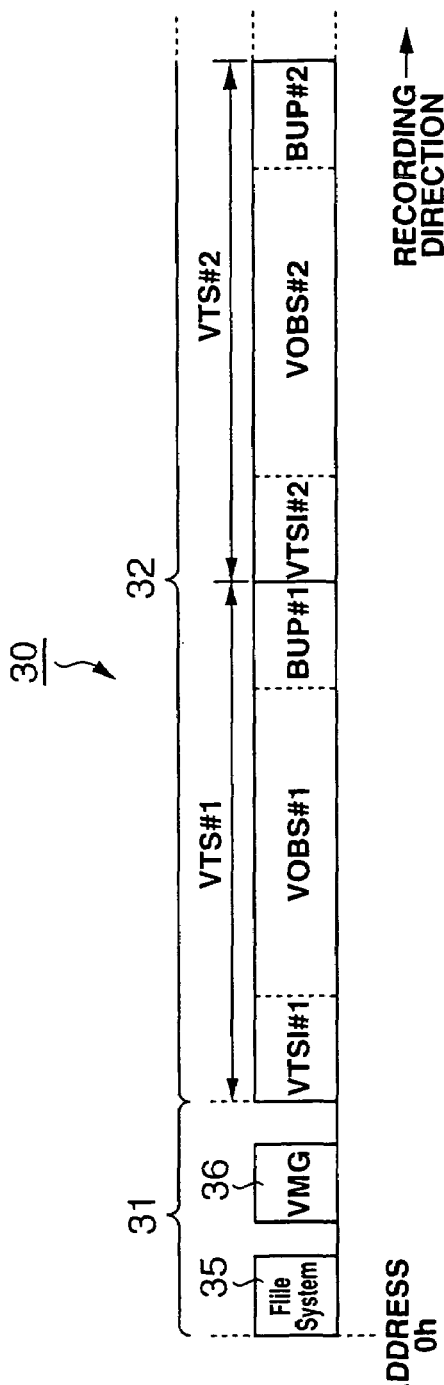
FIG. 3 explains a format (ROW mode) of the DVD-RW disk.
Figure 3B:
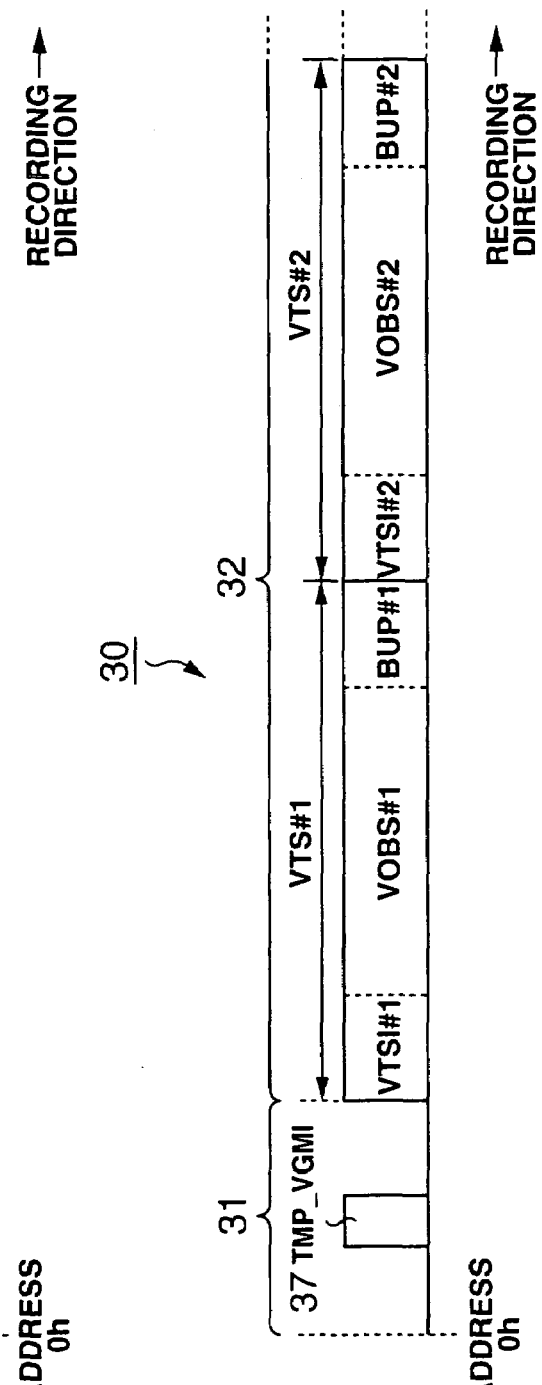

FIG. 3 shows a file in the DVD-RW disk having content data recorded therein in the ROW mode. FIG. 3A shows a file recorded in the disk already finalized, and FIG. 3B shows a file recorded in the disk not yet finalized.

Note that the "finalize" is to record, to a DVD disk, necessary management information, dummy data, etc. other than content data in order to enable playback of the DVD disk by a read-only DVD player.

As shown in FIGS. 3A and 3B, the DVD-RW disk has a file system and VMG area 31 and a VTS area 32 formed in a recording area 30 thereof.

The file system and VMG area 31 is formed along the inner circumference of the disk, that is, at the recording start address (address 0h) in the recording area as shown in FIG. 3A. A UDF (universal disk format) file system 35 and DVD-VIDEO format-defined VMG (video manager) 36 are recorded in the file system and VMG area 31. In the UDF file system, 35, there are stated file attributes including the start position, size and date of recording of each file including VMG, subdirectory name, number of the files, filiation of directories, etc. The VMG 36 has stated therein information including the record address and date of recording of each of VTSs recorded in the VTS area 32, number of VTSs, and entity data (MPEG-2 data stream) for display on a menu screen.

The VTS area 32 is formed to extend from a position a predetermined distance off the recording start address (address 0h) to the outer circumference of the disk. One or more VTSs (video title set) is recorded in this VTS area 32. The VTS is a file set formed for each title. The VTS is composed of three files: VTSI #n, VOBS #n and BUP #n. It should be noted here that "#n" indicates a number for each title recorded in the VTS area 32, ranging from 1 to 99.

The VSTI #n is a file including management information for the VTS. The BUP #n is a backup file for the VTSI #n. The VOBS $n is a file including entity data on the VTS, that is, an MPEG-2 data stream.

Also, the UDF file system 35 and VMG 36 in the file system and VMG area 31 are written during finalization of the disk. Namely, before the finalization, the DVD-RW disk will have no UDF file system 35 and VMG 36 written therein.

To enable access to a file in the VTS area 32 even before the DVD-RW disk in the ROW mode is finalized, intermediate-state management information (will be referred to as "TMP_VMGI" hereunder) 37 is recorded in the file system and VMG area 31 starting at the predetermined address (address 2c0h) as shown in FIG. 3B. The TMP_VMGI 37 has stated therein information such as the name, address, size, date of recording of each of files in each of VTSs recorded in the VTS area 32, and number of VTSs.

When a new VTS is recorded, the title content of VTS is updated or VTS is deleted, namely, the information recorded in the VTS area 32 is updated, the above TMP-VMGI 37 is also updated. On this account, a DVD recording/playback system can read the TMP_VMGI 37 will be able to record and reproduce a recorded title even if the DVD disk is not yet finalized.

FIG. 4 shows a file in the DVD-RW disk having content data recorded therein in the INC mode. FIG. 4A shows a file recorded in the disk already finalized, and FIG. 4B shows a file recorded in the disk not yet finalized.

In the INC mode, the UDF file system 35 and VMG 36 are recorded in the file system and VMG area 31 and one or more VTSs is recorded in the VTS area 32 as in the ROW mode, as shown in FIG. 4A.

In the INC mode, however, the TMP_VMGI 37 is recorded in the VTS area 32 as shown in FIG. 4B. In the INC mode, in case a new VTS is recorded, the TMP_VMGI 37 is recorded an area between VTSI #n and VOBS #n in the VTS. In case the VTS content is updated without recording any new VTS (for example, in case VOBS is erased or title is changed), the TMPO_VMGI 37 will be recorded in the outermost circumferential position of a current recorded area. Thus, when the information in VTS is updated a plurality of times, a plurality of TMP_VMGI 37 will be recorded in different areas. The outermost one of such TMP_VMGIs 37 should be taken as valid information.

Figure 5:
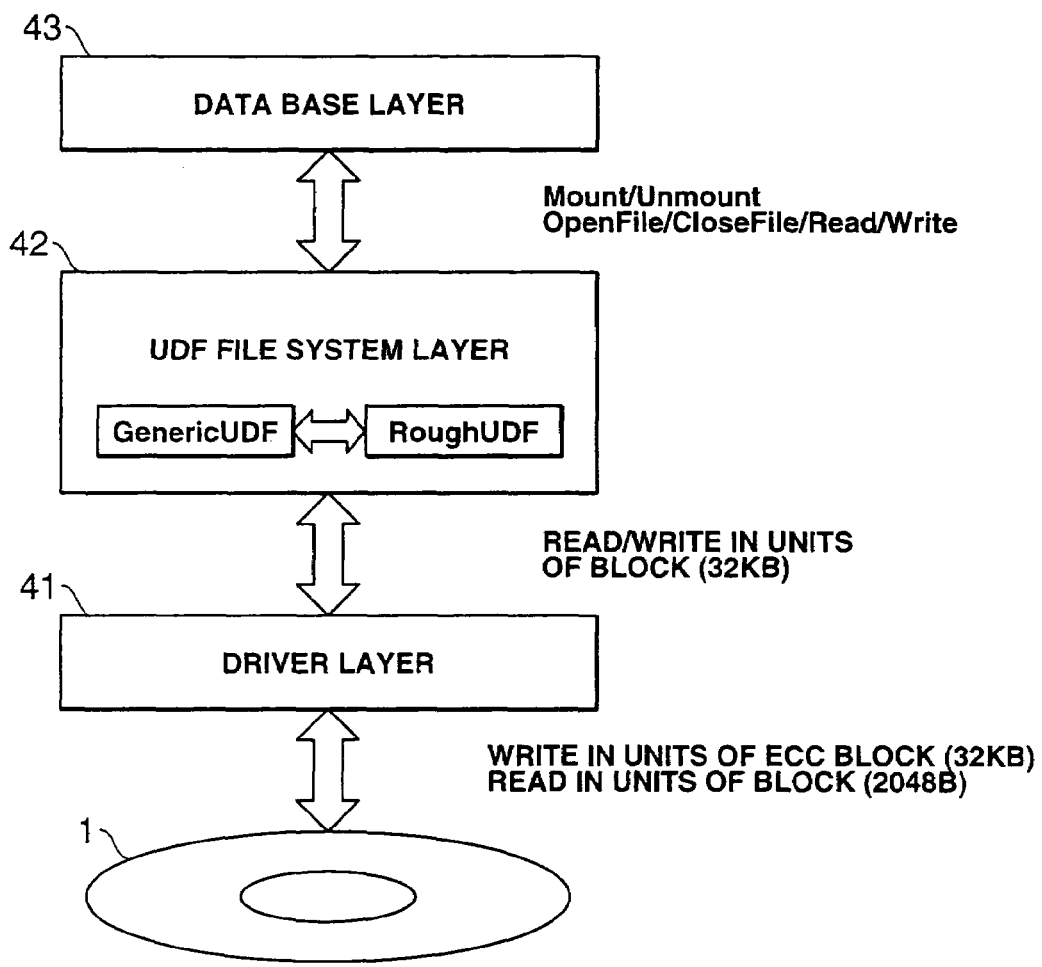
FIG. 5 shows the construction of the control module in the DVD recorder according to the present invention.

Construction of recording/playback control software module:

The recording/playback control software module of the DVD recorder 10 is constructed as will be described below:

In the DVD recorder 10, the recording/playback control software module is constructed of three layers as shown in FIG. 5.

As shown, the recording/playback control software module includes a driver layer 41 as a software module for access to a physical layer in the DVD disk 1, a UDF file system layer 42 as a software module for logical access to the DVD disk 1 in units of a file defined in UDF, and a data base layer 43 as a software module for logical access to the DVD disk 1 in units of a content, to be written or read, defined in the DVD format. These software modules work in a program in the system controller 26.

The driver layer 41 is supplied with a command for write/read of data in units of a physical address in the disk (32 kB) from the UDF file system layer 42. The driver layer 41 controls data write to the DVD disk 1 in units of an ECC block of 32 kB according o the command supplied from the UDF file system layer 42. Also, the driver layer 41 controls data read from the DVD disk 1 in units of 2038 blocks according to the command supplied from the UDF file system 42.

The UDF file system 42 is supplied, from the data base layer 43, with various commands concerning the file manipulation defined in UDF, including an open-file command for opening a file, close-file command for closing a file, a read command for reading data in a predetermined position in a file, write command for writing data to a predetermined position in a file, and mount/demount command for mounting or demounting a file system. The UDF file system layer 42 identifies the physical address position of a file included in a command supplied from the data base layer 43 with reference to a mounted file system, converts the command into a command for writing or reading data in units of a physical address and supplies the command to the driver layer 41.

The data base layer 43 writes and reads a data base in units of a content complying with the DVD-VIDEO Standard, and issues a command for writing and reading a file having a corresponding content data stored therein to the UDF file system layer 42. More specifically, the data base layer 43 identifies the recorded position of VTS according to VGMI in VGM and also the recorded position of a predetermined data with reference to VTSI in VTS or search information in a navigation package, and issues a command for writing to, or reading from, the identified file and data position.

Note that the "file system" is information having stated therein the name of each file and directory recorded in the disk, recording start address of each file, size of each file, date of recording, etc. Therefore, by identifying an arbitrary file on the basis of a name including a directory, it is possible to a physical position in the DVD disk 1 where the file is recorded with reference to the file system.

Also, the "file system mount" is to register a file system in a predetermined register area managed by the UDF file system layer 42. By mounting a file system, it is possible to write and read data in the UDF file system layer 42. Also, the "file system demount" is to demount a file system register in a predetermined register area. In the DVD recorder 10, a file system mount command and file system demount command are supplied from the data base layer 43 to the UDF file system layer 42.

In the DVD recorder 10, two methods are used for mounting a file system and are appropriately selected for use depending upon a current situation. One of the methods will be called "GenericUDF" and the other be called "RoughUDF".

The "GenericUDF" is similar to the other ordinary method of mounting a UDF file system. In this method, a file system recorded in the disk is read for registration of its content. More specifically, in the case of DVD-RW or DVD-R disk, the file system 35 shown in FIGS. 3A and 4A is read for registration of its content.

The "RoughUDF" is a method peculiar to the DVD recorder 10 according to the present invention. In this method, information on a file generated at the data base layer 43 is virtually accepted and mounted as a file system. Use of this "RoughUDF" permits to read and write a file as if a correct file system 35 were recorded in the disk even if the file system 35 is not recorded in the disk or the file system 35 in the disk is partially erroneous, for example.

Figure 6:
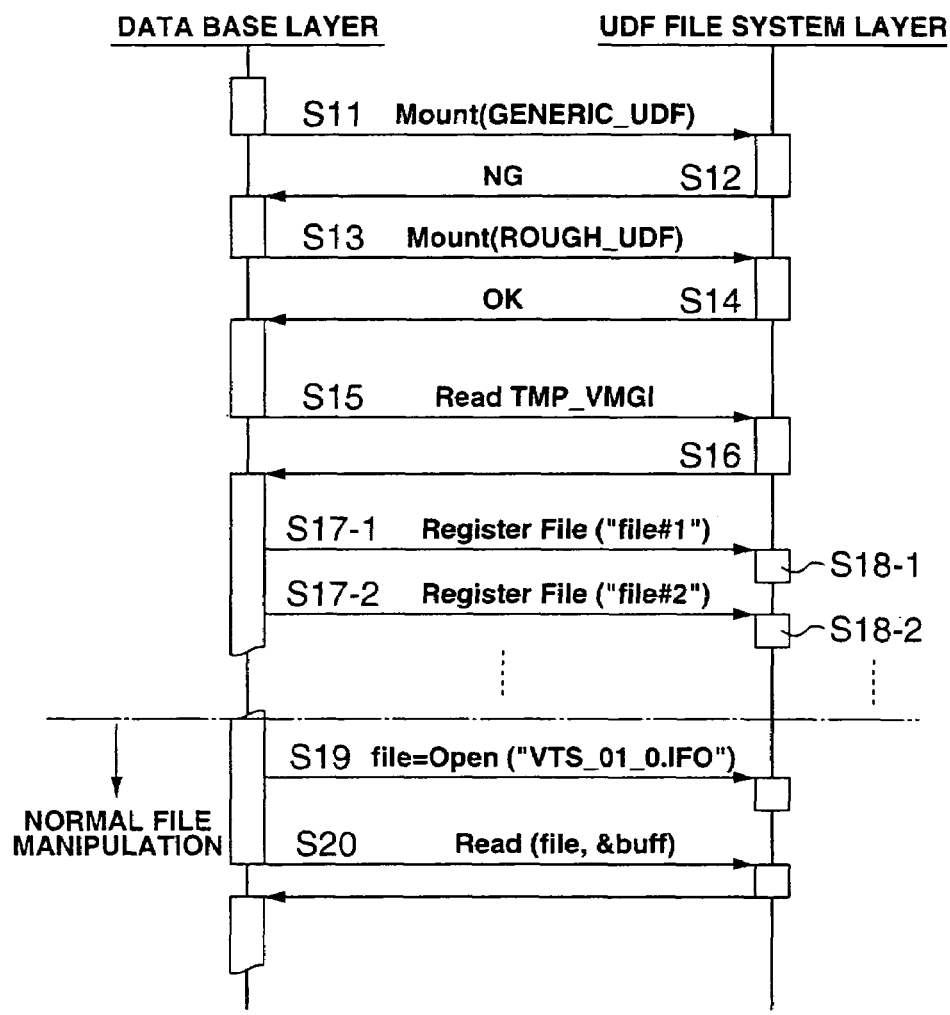
FIG. 6 shows the sequence of mounting a file system of a DVD-RW or DVD-R disk being in the intermediate state, namely, not yet finalized.

File system mounting in intermediate-state DVD-RW:

A file system is sequentially mounted in a DVD-RW and DVD-R disk, not yet finalized, namely, in an intermediate state, as will be described below with reference to FIG. 6.

It is assumed here that in the DVD recorder 10, there is loaded a DVD-RW or DVD-R disk having data recorded therein in a format compatible with the DVD-VIDEO DISK, and the disk thus loaded is in an intermediate state before finalization. In this case, a file system is mounted between the data base layer 43 and UDF file system layer 42 in a sequence which will be described below.

First, the data base layer 43 selects the "GenericUDF" method and issues a file system mount command (Mount (GENERIC_UDF)) to the UDF file system layer 42 (step S11).

Supplied with the file system mount command issued in step S11, the UDF file system layer 42 tries to read the file system 35 recorded at a predetermined address in the disk. In this case, however, since the disk loaded has not yet been finalized, the UDF file system layer 42 will fail in reading the file system 35. The UDF file system layer 42 will inform the data base layer 43 of this unsuccessful file system mounting (step S12).

Informed of the failure in file system mounting in step S12, the data base layer 43 issues a command for mounting the file system by the "RoughUDF" method (Mount(ROUGH_UDF)) to the UDF file system layer 42 (step S13).

Receiving the mount command issued in step S13, the UDF file system layer 42 will inform that it has accepted the mount when the memory area for registration of the file system is opened (step S14).

Receiving the information that the UDF file system layer 42 has accepted the mount in step S14, the data base layer 43 issues a command for reading TMP_VMGI (Read TMP_VMGI) defined in the DVD-RW or DVD-R disk (step S15). It should be noted that different from an ordinary command for reading a file with reference to a file system, the command for reading TMP_VMGI (Read TMP_VMGI) is a command under which the UDF file system layer 42 can read TMP_VMGI directly at the address where it is recorded without reference to any file system.

Receiving the command for reading TMP_VMGI in step S15, the UDF file system layer 42 reads the TMP_VMGI 37 and supplies the data thus read to the data base layer 43 (step S16).

Receiving the TMP_VMGI 37 from the UDF file system layer 42 in step S16, the data base layer 43 interprets the content of the TMP_VGMI 37. Specifically, the TMP_VGMI 37 has stated therein information including the name of each file in each VTS recorded in the VTS area 32, recorded address of each file, file size, data of recording and number of VTSs. While interpreting the content of the TMP_VMGI 37, the data base layer 43 generates information in a file system, that should be generated if the disk is currently finalized, with the format of the DVD-RW or DVD-R taken in consideration.

Then the data base layer 43 issues commands for registering the attribute and directory of each file in VTS to the register area where a file system should normally be registered (Register File (file #1), Register File (file #2), . . . ) to the UDF file system layer 42 (steps S17-1, S17-2, . . . ).

Receiving the commands for registration of the file attributes etc. (Register File (file #1), Register File (file #2), . . . ) in steps S17-1, S17-2, . . . the UDF file system layer 42 registers information send along with the commands to a predetermined register area.

Then, the UDF file system layer 42 exits the file system mounting by the "RoughUDF" method with registration of the information on all files and directories. Therefore, the data base layer 43 can subsequently issue, to the UDF file system layer 42, a command for opening a predetermined file ("VTS_01_0.IFO") as in step S19 and a command for reading data in a predetermined position in an opened file as in step S20.

In the DVD recorder 10 constructed as above, it is possible to access even a DVD disk not finalized, namely, in the intermediate state, such as DVD-RW or DVD-R, by effecting the file system mounting by the "RoughUDF" method to build a virtual file system.

Figure 7:
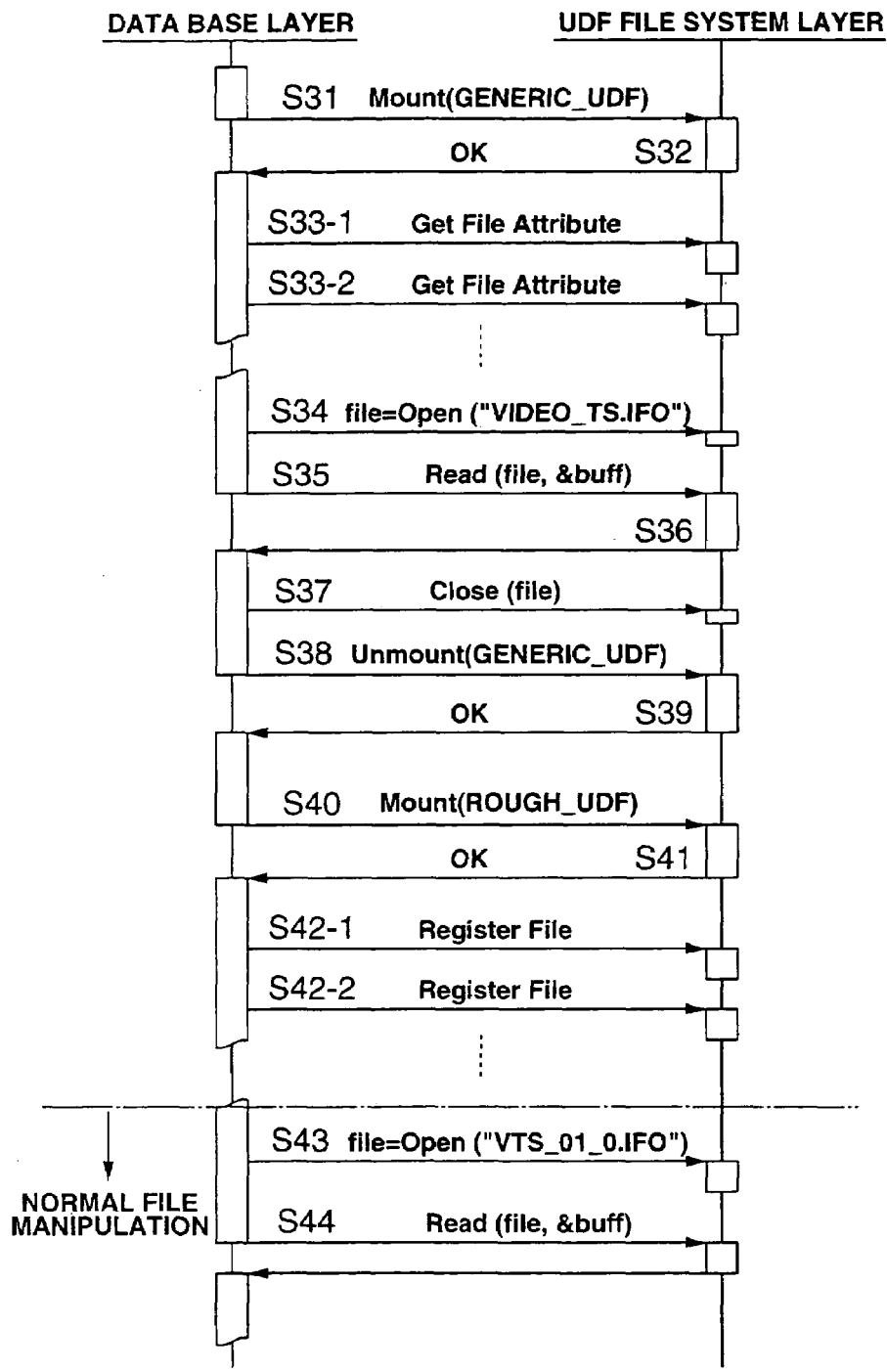
FIG. 7 shows the sequence of mounting a file system into a disk recorded in the DVD-VIDEO format.

File system mounting in DVD-VIDEO disk:

A file system is sequentially mounted in a DVD-VIDEO disk (or any other DVD disk having data recorded in a format compatible with the DVD-VIDEO disk) as will be described below with reference to FIG. 7.

It is assumed here that in the DVD recorder 10, there is loaded a DVD disk having data recorded therein in a format compatible with the DVD-VIDEO disk. In this case, a file system is mounted between the data base layer 43 and UDF file system layer 42 in a sequence which will be described below.

First, the data base layer 43 selects the "GenericUDF" method and issues a file system mount command (Mount (GENERIC_UDF)) to the UDF file system layer 42 (step S31).

Supplied with the file system mount command issued in step S31, the UDF file system layer 42 reads the file system 35 recorded at a predetermined address in the disk. The UDF file system layer 42 exits the file system mounting by the "GenericUDF" method with registration of the file system 35 thus read into a predetermined register area. When the file system mounting is over, the UDF file system layer 42 will inform the data base layer 43 of this successful file system mounting (step S32).

Informed of the successful file system mounting in step S32, the data base layer 43 issues a command for acquisition of a file attribute that can only be acquired from the file system (Get File Attribute ("file #1") . . . ) (steps S33-1, S33-2, . . . ) and acquires the information.

Figure 8:
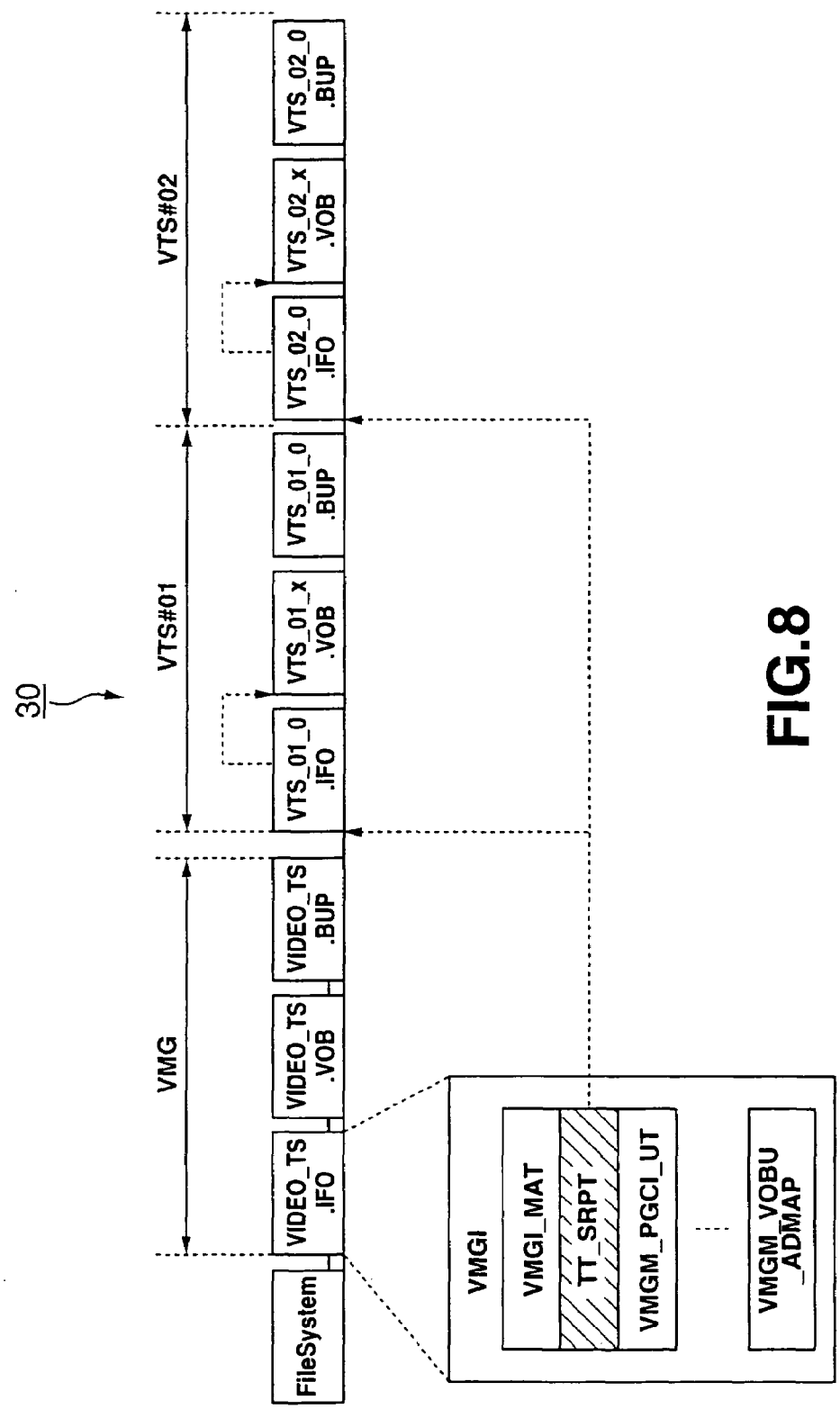
FIG. 8 explains TT-SRPT defined in the DVD-VIDEO Standard.

Note that the "file attribute that can only be acquired from the file system" is information stated in a file system, but not in TT_SRPT defined in the DVD-VIDEO Standard. The "TT_SRPT" is information stated in the VMGI file of VMG as shown in FIG. 8. The TT_SRPT has stated therein information indicating the top address in a VTS.IFO file which is a VTS management information file. Therefore, according to the DVD-VIDEO Standard, each file can be accessed via TT_SRPT. More specifically, the "file attribute that can only be acquired from the file system" is a backup file for the VTS.IFO file which is a VTS management information file (VTS. BUP), a file having JacketPicture stored therein, etc.

Completing the acquisition of the file attribute in steps S33-1 and 33-2, the data base layer 43 issues a command for opening a file (VIDEO_TS.IFO file) having VMGI stated therein (file=Open("VIDEO_TS.IFO")) (step S34). Next to step S34, the data base layer 43 issues a command for reading "TT_SRPT" in a predetermined offset position (&buff) from the top position in a currently open file (VIDEO_TS.IFO) (Read file,&buff) (step S35).

In response to the read command issued in step S35, the UDF file system layer 42 reads data from the disk and transfers the data thus read to the data base layer 43 (step S36).

Finishing the data transfer in step S36, the data base layer 43 issues a command from closing the currently opened file (VIDEO_TS.IFO) (Close(file)) (step S37). Next to this step, the data base layer 43 issues a command for unmounting the file system by the "GenericUDF" method (Unmount(GENERIC_UDF)) to the UDF file system layer 42 (step S38).

Receiving the unmount command issued in step S35, the UDF file system layer 42 opens the memory area in which the file system is registered. Here, the UDF file system layer 42 exits the file system unmounting by the "GenericUDF". After the file system is unmounted, the UDF file system layer 42 informs the data base layer 43 that it has unmounted the file system (step S39).

Receiving the information that the file system has been unmounted in step S39, the data base layer 43 issues a command for mounting a file system by the "RoughUDF" method (Mount(ROUGH_UDF)) to the UDF file system layer 42 (step S40).

Receiving the mount command issued in step S40, the UDF file system layer 42 informs the data base layer 43 that it has accepted the mounting when the memory area for registration of the file system is opened (step S41).

Receiving the information that the UDF file system layer 42 has accepted the mounting in step S41, the data base layer 43 generates information in the file system on the basis of the content of TT_SRPT and file attribute information acquired in step S33. The data base layer 43 generates at least a file system for TT_SRPT-based information for information indicating of the attribute of the VTS.IFO file.

Then, the data base layer 43 issues, to the UDF file system layer 42, a command for registering the content of the generated file system (attribute and directory of each file) into a memory area in which a file system should normally be registered (Register File (file #1), Register File (file #2), . . . ) (steps S42-1, S42-2, . . . ).

Receiving the file attribute register command (Register File (file #1), Register File (file #2), . . . ) issued in steps S42-1, 42-2, . . . , the UDF file system layer 42 registers information sent along with the command into a predetermined register area where a file system should be registered.

Then, the UDF file system layer 42 exits the file system mounting by the "RoughUDF" method with registration of the information on all the files and directories. Therefore, the data base layer 43 can subsequently issue, to the UDF file system layer 42, a command for opening a predetermined file ("VTS_01_0.IFO") as in step S43 and a command for reading data in a predetermined position in an opened file as in step S44.

As above, even if a DVD disk in which a file system is partially erroneous as shown in FIG. 9 in the DVD recorder 10 is loaded in the DVD recorder 10, for example, a file system having the erroneous statement corrected can be built and accessed by effecting the file system mounting by the "RoughUDF" method.

Note that a part of information in a file system originally written in a disk, that will be replaced with the content of TT_SRPT, may be stored by an alias name. By storing such information part to be replaced with the TT_SRPT as above, it is possible to refer to the content of the original file system in case the TT_SRPT itself, for example, is erroneous.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, in the recording/playback device and recording medium access method according to the present invention, a file system recorded in the recording medium is not read for registration, but file management information is read from a predetermined file in the recording medium and a file system generated based on the file management information is newly registered.

Thus in the above recording medium access method, data supplied via the file system can be written to or read from even a recording medium having no file system recorded therein or a recording medium having recorded therein a file system which is partially erroneous.

What is claimed is:

1. A recording/playback device that records and reproduces data to and from a recording medium, the device comprising:
   a system controlling means for controlling access to the recording medium by a file system processing module that reads and writes data from and to the recording medium with reference to a file system containing data indicating a physical storage location of a file on the recording medium; and
   a data base processing module configured to access the file system processing module with reference to content management information for management of contents stored in the recording medium, the recording medium having recorded therein file search information indicating a physical recorded position of a file having the content management information stored therein;
   the database processing module configured to read the file search information without reference to the file system, and register attribute information corresponding to a file including at least the content management information into the file system with reference to the file search information.

2. The device according to claim 1, wherein when the file system processing module has failed in mounting a file system stored in a predetermined position in the recording medium, the data base processing module registers attribute information on a file including at least the content management information into the file system with reference to the file search information.

3. The device according to claim 1, wherein the data base processing module controls the file system processing module to mount a file system stored in a predetermined position in the recording medium, reads the file search information with reference to the file system being mounted, while acquiring attribute information corresponding to a file from the file system being currently mounted, controls the file system processing module to demount the current file system, generates a new file system on the basis of the read file search information and attribute information, and controls the file system processing module to mount the new file system.

4. A recording medium access method of controlling access to a recording medium by a file system processing module that reads and writes data from and to the recording medium with reference to a file system containing data indicating a physical storage location of a file on the recording medium, and a data base processing module that accesses the file system processing module with reference to content management information for management of the contents stored in the recording medium, the method comprising:
   issuing commands for reading and writing a file according to the content management information from the data base processing module to the file system processing module;
   employing the file system processing module to read and write data from and to the recording medium with reference to the file system according to the commands from the data base processing module; and
   employing the data base processing module to read from the recording medium, when mounting a file system file search information indicating a physical recorded position of a file having the content management information stored therein without reference to the file system, and register attribute information on a file including at least the content management information into the read file system with reference to the read file search information.

5. The method according to claim 4, wherein when the file system processing module has failed in mounting a file system stored in a predetermined position in the recording medium, the data base processing module registers attribute information on a file including at least the content management information into the file system with reference to the file search information.

6. The method according to claim 4, wherein the operation of the data base processing module further comprises:
   controlling the file system processing module to mount a file system stored in a predetermined position in the recording medium;
   reading the file search information with reference to the file system being mounted, while acquiring attribute information corresponding to a file from the file system being currently mounted;
   controlling the file system processing module to demount the current file system;
   generating a new file system on the basis of the read file search information and attribute information; and
   controlling the file system processing module to mount the new file system.

7. A recording/playback device that records and reproduces data to and from a recording medium, the device comprising:
   a system controller configured to control access to the recording medium by a file system processing module that reads and writes data from and to the recording medium with reference to a file system containing data indicating a physical storage location of a file on the recording medium;
   a data base processing module configured to access the file system processing module with reference to content management information for management of contents stored in the recording medium;
   the recording medium having recorded therein file search information indicating physical recorded position of a file having the content management information stored therein; and
   the database processing module configured to read the file search information without reference to the file system and register attribute information on a file including at least the content management information into the file system with reference to the file search information.

8. A recording medium access method of controlling access to a recording medium by a file system processing module that reads and writes data from and to the recording medium with reference to a file system containing data indicating a physical storage location of a file on the recording medium, and a data base processing module that accesses the file system processing module with reference to content management information for management of the contents stored in the recording medium, the method comprising:

issuing commands for reading and writing a file according to the content management information from the data base processing module to the file system processing module;

employing the file system processing module to read and write data from and to the recording medium with reference to the file system according to the commands from the data base processing module; and employing the data base processing module to read from the recording medium, when mounting a file system, file search information indicating a physical recorded position of a file having the content management information stored therein without reference to the file system, and register attribute information on a file including at least the content management information into the read file system with reference to the read file search information.

* * * * *